Nov. 12, 1957  T. J. SULLIVAN  2,812,770
SAFETY CUT-OFF VALVE
Filed May 8, 1956  3 Sheets-Sheet 1
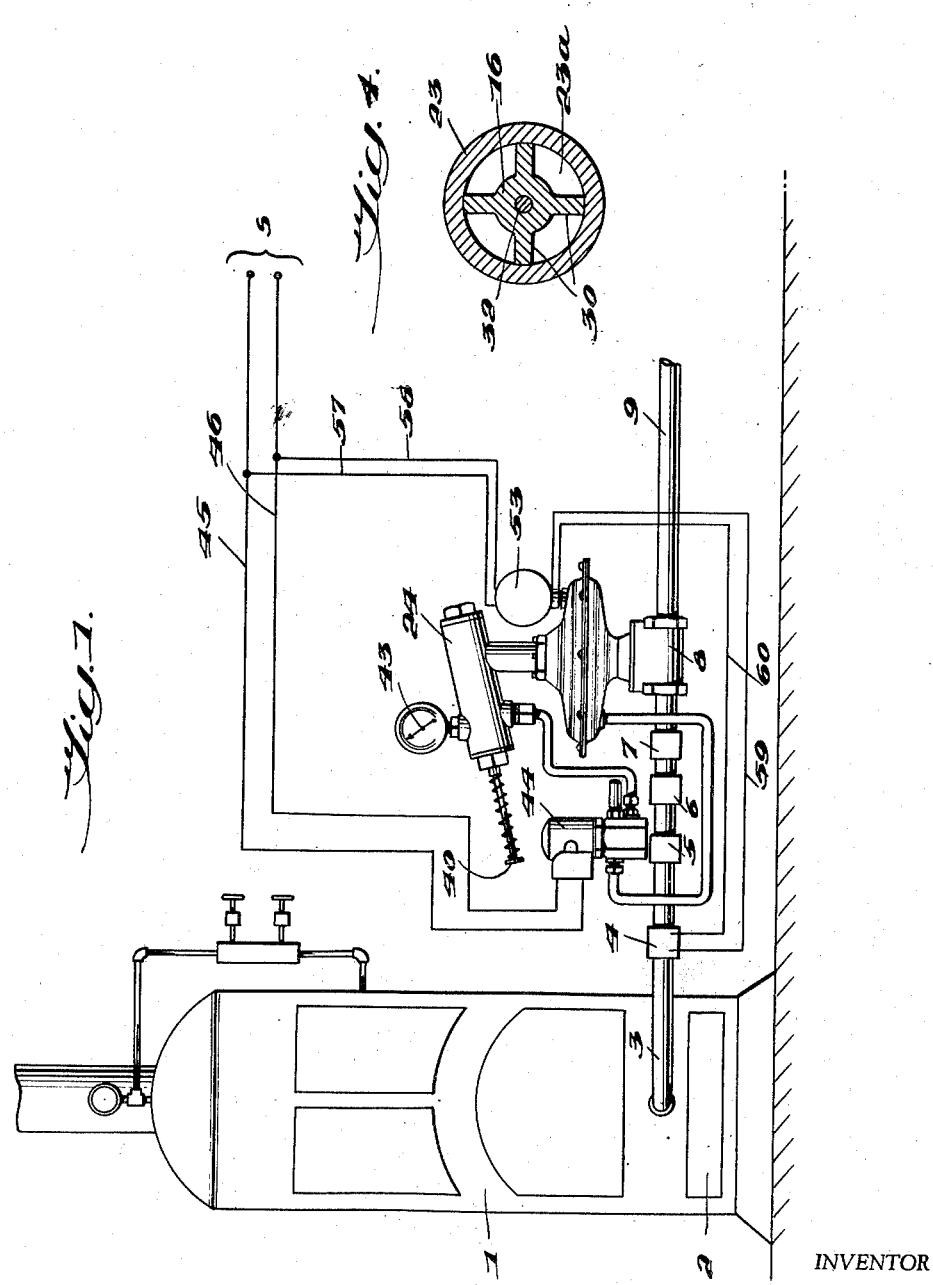
INVENTOR
Timothy J. Sullivan
BY Pierce, Scheffler & Parker
ATTORNEYS

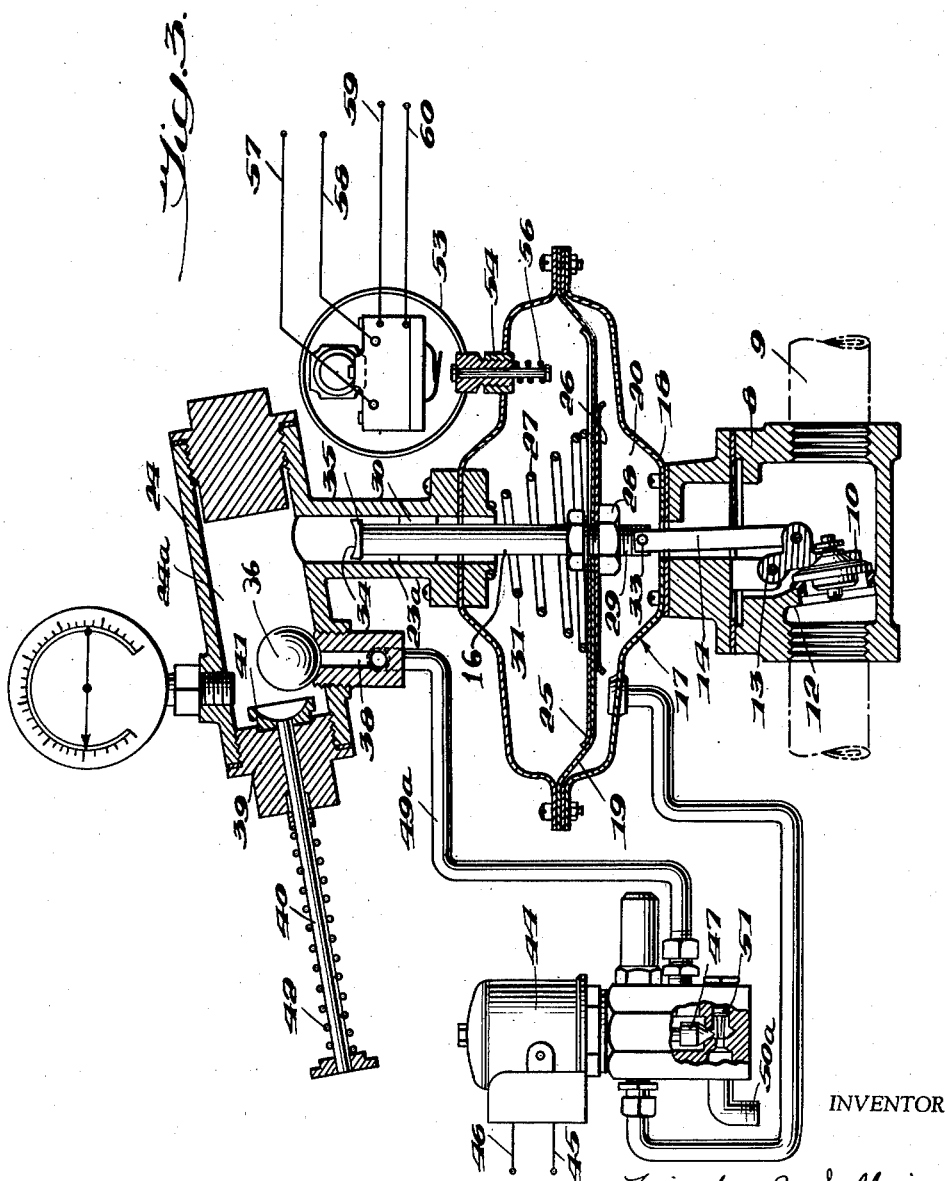

Nov. 12, 1957

T. J. SULLIVAN 2,812,770

SAFETY CUT-OFF VALVE

Filed May 8, 1956

INVENTOR

Timothy J. Sullivan

BY Pierce, Scheffler & Parker

ATTORNEYS

United States Patent Office 2,812,770
Patented Nov. 12, 1957

2,812,770

SAFETY CUT-OFF VALVE

Timothy J. Sullivan, Butte, Mont., assignor to Sullivan Valve and Engineering Company, Butte, Mont., a corporation of Montana Application May 8, 1956, Serial No. 583,410

4 Claims. (Cl. 137—39)

This invention relates to safety cut-off valves for use in pressure gas lines such as the fuel supply line to gas-fired heaters and boilers of domestic or industrial types, and more particularly to a valve which operates automatically to shut off the supply of gas to a burner upon the occurrence of any one of a number of abnormal conditions and which must be manually reset to restore operation of the burner. This invention is an improvement over my prior safety cut-off valve described in U. S. Patent #2,637,331.

An object of the invention is to provide a cut-off valve which closes automatically under certain abnormal conditions and which may be manually reset to open only after removal of all abnormal conditions which would result in an immediate reclosure of the valve.

A more specific object of my invention is to provide a manually reset cut-off valve which closes automatically in the event of electric power failure, sudden increase or decrease in the gas supply main, or shock due to explosion or earthquake.

Other objects and advantages of my invention will become more apparent from a study of the following specification when considered in conjunction with the accompanying drawings, in which:

Fig. 1 is a schematic view of a system embodying the invention;

Figs. 2 and 3 are central vertical sections through the safety cut-off valve in open and closed conditions, respectively;

Fig. 4 is a cross-section of the hollow stem and sleeve taken along line 4—4 of Fig. 2.

Figure 12:
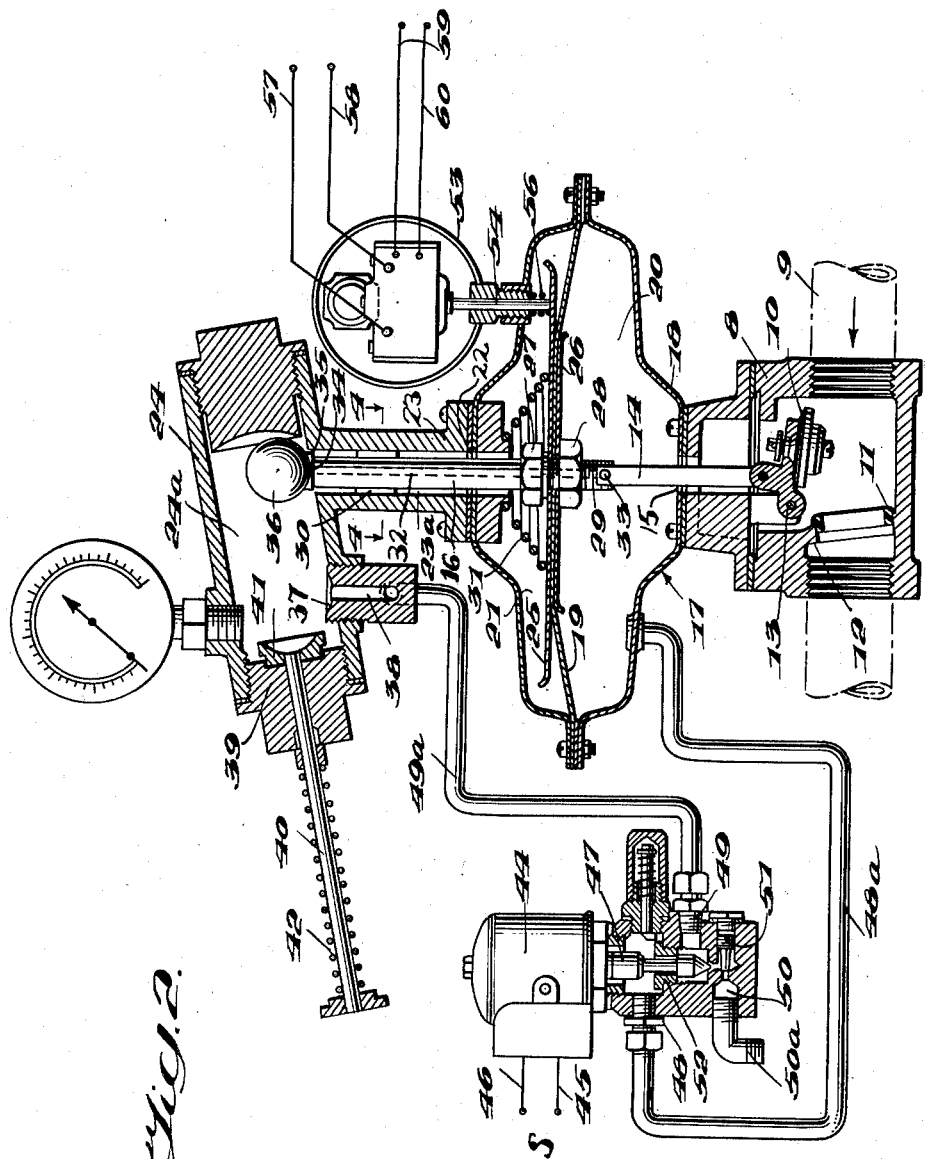

Referring more particularly to the drawings, the invention is shown as applied to a steam boiler 1 equipped with a gas burner 2 fed with gas through a supply conduit 3. Located in series in the supply conduit 3 are a firing valve 4, an electric control valve 5 (similar to that disclosed in my prior U. S. Patent #2,333,212, for example), a pressure regulator 6, a meter 7, and the safety cut-off valve 8 which constitutes the instant invention. Gas is supplied to the valve 8 from a source, not shown, through the supply main 9.

The valve 8 is of the large capacity full-flow type and has a valve member 10 adapted to cooperate with an annular seat 11 on a transverse wall 12 and is pivotally mounted within the valve casing on pivot 13. Pivotally secured at its lower end to valve member 10 is connecting link 14 which extends through an opening 15 in the upper portion of the valve casing. Connecting link 14 is connected at its upper end to hollow stem 16.

Secured to the upper portion of the valve casing is a pressure motor 17 having a casing 18 with a diaphragm 19 therein which separates lower pressure motor chamber 20 from upper chamber 21. The pressure motor casing 18 has an opening in the lower portion thereof cooperating with the opening 15 in the valve casing, and an opening 22 in the upper portion thereof. Secured to the upper portion of pressure motor casing 18 and cooperating with opening 22 therein is a sleeve 23 which supports ball valve chamber housing 24 and provides communication between upper chamber 21 and ball valve chamber 24a. As seen from the drawings, hollow stem 16 is slidably movable within sleeve 23 and opening 22, and extends through diaphragm 19 and through pressure plates 25, 26 adjacent the upper and lower surfaces of said diaphragm. Lock nuts 27 and 28 threaded upon the lower portion 29 of hollow stem 16 serve to clamp the pressure plates together with diaphragm 19 therebetween, and thus rigidly secure the hollow stem to the diaphragm so that movement of the diaphragm 19 will be imparted to hollow stem 16, connecting link 14, and valve member 10 carried thereby. Projections 30 on hollow stem 16 serve to guide said stem within sleeve 23 upon longitudinal movement therein and to provide a passage 23a between upper chamber 21 and ball valve chamber 24a. Compression spring 31 tends to urge diaphragm 19 downwardly to maintain valve member 10 in its closed position as shown in Fig. 3.

Hollow stem 16 has a bore 32 extending longitudinally therethrough, with an opening 33 to said bore in its lower portion 29 within lower chamber 20, and a second opening 34 in its upper extremity within the ball valve chamber 24a. Thus it may be seen that bore 32 provides a passage through the diaphragm connecting lower chamber 20 to ball valve chamber 24a and upper chamber 21. At its upper extremity adjacent the opening 34 hollow stem 16 has a concave portion 35 adapted to receive ball 36. When ball 36 is seated upon the concave portion 35, the opening 34 is closed.

Ball valve chamber 24a is downwardly inclined from the point of communication with sleeve 23 and has such a diameter as to allow free longitudinal movement of ball 36 therein. At the lower end of said bore is a seat 37 for the ball 36, and cooperating with said seat is a passage 38 so arranged that when said ball is seated upon said seat 37, said passage 38 is closed. Longitudinally slidable in lower wall 39 of chamber housing 24 is a reset member 40 having a concave head portion 41 located within said chamber. Spring 42 urges said reset member to position head portion 41 adjacent wall 39. Insertion of reset member 40 into said bore of ball valve chamber 24 enables ball 26 to be moved from its position on seat 37 (as shown in Fig. 3) to a position on seat 35 on hollow stem 16 (as shown in Fig. 2). Gage 43 communicates with ball valve chamber 24a to give an indication of the pressure therein.

Solenoid valve 44 provides means for closing valve member 10 upon the termination of electric power in power lines 45, 46 from power source S. The solenoid valve is provided with a vertically movable plunger 47 so arranged that upon the application of power to said solenoid valve the plunger is drawn upwardly as shown in Fig. 2, and when the power to said solenoid valve is discontinued, the plunger drops downwardly as shown in Fig. 3. The solenoid valve has a first inlet opening 48 connected by conduit 48a to the lower chamber 20 of pressure motor 17, and a second inlet opening 49 connected by conduit 49a to passage 38 cooperating with ball valve chamber 24a. Outlet opening 50 in solenoid valve 44 provides means for venting conduit 49a to the atmosphere. As may be seen from Figs. 2 and 3, when the solenoid plunger 47 is in its upper position conduit 49a is connected to the atmospheric vent 50 through passage 51 in the solenoid valve. When the plunger is in its lower position conduit 48a is connected to conduit 49a through passage 52 in the solenoid valve.

Micro safety switch 53 is secured to the upper portion of the pressure motor casing and is provided with a slidably movable member 54 which extends into the upper chamber 21. The lower extremity of member 54 cooperates with pressure plate 25 so that when diaphragm 19 is in its upper position and valve member 10 is in the open position as shown in Fig. 2, member 54 is moved upwardly causing contacts 55 of micro safety switch 53 to close. Upon downward movement of diaphragm 19 as shown in Fig. 3, spring 56 causes member 54 to move downwardly and contacts 55 to open. Electric power is supplied to the input contacts of micro safety switch 53 through lines 57, 58. Output lines 59, 60 control the operation of the firing valve 4 of Fig. 1. Thus it is apparent that when valve 8 is open and diaphragm 19 is in its upper position, contacts 55 of micro switch 53 are closed, and electric power is applied to firing valve 4 to maintain said valve in its open position. Upon closure of valve 8, contacts 55 open, power is removed from firing valve 4, and firing valve 4 closes.

The method of operation of the apparatus will now be described. The valve 8 is installed in the supply lines 3, 9 and valve member 10 is in its closed position as shown in Fig. 3. Electric power is applied to solenoid 44 through lines 45, 46 and causes plunger 47 to be drawn upwardly, venting line 49a through opening 51. Reset member 40 is then inserted into ball valve chamber 24a to move ball 36 to the upper extremity thereof. When the ball is removed from the seat 37, passage 38 is opened. Now the upper chamber 21 is open to the atmosphere through sleeve passage 23a, chamber 24a, passage 38, line 49a, through opening 51, and out vent 50a. Since gas pressure from line 9 will be fed to lower chamber 20 through opening 15 in the valve casing, the pressure in lower chamber 20 will be greater than the pressure in upper chamber 21, and diaphragm 19 will move upwardly. Ball 36 will then be seated upon seat 35 of hollow stem 16, reset member 40 may be released, and the valve 8 will be in its open position as shown in Fig. 2. Contacts 55 of micro switch 53 will be closed, and firing valve 4 will be closed.

Upon the failure of electric power, excess in supply pressure, or shock due to earthquake or explosion, valve 8 will automatically be closed. If the power supply should fail, for example, solenoid plunger 47 would drop, lines 48a and 49a would be joined through solenoid valve opening 52, and the pressures in upper chamber 21 and lower chamber 20 would be equalized through line 48a, line 49a, ball chamber 24a, and sleeve passage 23a. Upon downward movement of diaphragm 19, hollow stem 16 and connecting link 14 will move downwardly to close valve member 10 on valve seat 11.

If the valve 18 is in the open position as shown in Fig. 2 and the ball 36 is jarred off of seat 35 by shock due to an explosion or earthquake, ball 36 will roll down ball valve chamber 24a to seat upon seat 37. Gas will pass through opening 33 in the lower portion 29 of valve stem 16, travel up the passage 32, and down the sleeve passage 23a to cause equalization of pressure between lower chamber 20 and upper chamber 21. Diaphragm 19 will then drop to close member 10 upon seat 11.

Similarly, upon the surge of gas into lower chamber 20 from supply line 9, a jet of gas will enter opening 33 and pass upwardly through passage 32 to lift ball 36 from seat 35, equalize the pressure between upper chamber 21 and lower chamber 20, and cause diaphragm 19 to drop and valve member 10 to close. A sudden decrease in supply pressure would have the effect of causing diaphragm 19 to drop slightly, displacing ball 36 from seat 34, and similarly resulting in the closure of valve member 10 upon seat 11. By varying the size and weight of ball 36 the sensitivity of the device may be determined as desired.

Thus my improved safety cut-off valve provides means for closing the supply valve upon failure of electric power, shock due to earthquake or explosion, or sudden change in pressure in the gas supply main. While the primary application of my invention is in a gas supply line feeding a gaseous fuel burner, it is obvious that the valve may similarly be utilized for the control of any conduit connecting a source of gaseous medium to a specific demand apparatus.

While in accordance with the provisions of the Statutes I have illustrated and described the best form of embodiment of my invention known to me, it will be apparent to those skilled in the art that changes may be made in the form of the apparatus described without departing from the spirit of my invention as set forth in the appended claims.

I claim:

1. A safety cut-off valve for use in a pressure gas line comprising a valve casing divided into an inlet chamber and an outlet chamber by a partition provided with a valve seat, a valve member in said inlet chamber cooperating with said valve seat, a pressure motor above said valve casing and an inclined ball valve chamber above said pressure motor, a flexible diaphragm extending across said pressure motor and having an upper and a lower position therein, said diaphragm dividing said pressure motor into an upper and a lower chamber, said upper chamber being in communication with the upper portion of said ball valve chamber and said lower chamber being in communication with the valve casing inlet chamber, a hollow stem secured to and extending through said diaphragm, said hollow stem extending upwardly to terminate in a valve seat within said ball valve chamber when said diaphragm is in its raised position, means connecting said hollow stem to said valve member so that when said diaphragm is in its upper position said valve is open and when said diaphragm is in its lower position said valve is closed, an opening in the lower portion of said ball valve chamber, a ball valve adapted to seat upon the valve seat at the upper end of said hollow stem or alternatively upon said ball valve chamber opening, a manually operable reset member for moving said ball from said chamber opening to said hollow stem seat, an electrically-controlled solenoid valve, said solenoid valve having a first input line connected to said ball valve chamber opening, a second input line connected to said pressure motor lower chamber, and an output vent line, said solenoid valve providing communication between said input lines when in a de-energized position and connecting said second input line to said output vent line when in an energized position, so that when said ball is upon said hollow stem seat and the power to said solenoid is removed, the pressure in said upper and lower chambers will be equalized through the solenoid connections to result in the falling of said diaphragm to said lower position and the closure of said valve.

2. A safety cut-off valve as defined in claim 1, wherein said hollow stem communicates at its lower end with said lower chamber so that when said solenoid valve is in its energized position and when said diaphragm is in its upper position with the ball upon said stem seat, removal of said ball from said seat due to shock imparted to the valve or sudden increase in the gas pressure therein will cause the pressure in said upper and lower valve chambers to be equalized, said diaphragm to drop, and said valve to close.

3. A safety cut-off valve as defined in claim 1, in combination with stationary means in said upper chamber for displacing said ball valve from its seat on said hollow valve stem upon lowering of said valve stem due to reduced pressure within said inlet chamber of the valve casing.

4. A safety cut-off valve as recited in claim 1, in combination with a pressure gauge secured to the upper chamber to indicate gas pressure therein.

No references cited.